Oct. 19, 1948.   E. W. WEAVER   2,451,791
UNIVERSAL JOINT
Filed Jan. 25, 1945

INVENTOR.
Elverton W. Weaver.
BY
Hull & West.
ATTORNEYS

Patented Oct. 19, 1948

2,451,791

UNITED STATES PATENT OFFICE 2,451,791

UNIVERSAL JOINT

Elverton W. Weaver, Cleveland Heights, Ohio, assignor to Towmotor Corporation, Cleveland, Ohio, a corporation of Ohio Application January 25, 1945, Serial No. 574,457

6 Claims. (Cl. 64—17)

This invention relates to universal joints and has for its general object to provide a joint which is simple in construction, inexpensive of production and capable of withstanding all incidents of use over a prolonged interval of time.

Among its more specific objects, my invention aims to provide a universal joint having a novel construction and arrangement of parts which will enable the same to be quickly and readily assembled and disassembled; to provide a universal joint wherein the yokes are connected by a driving element and cylindrical rocking bearing blocks connected to opposite ends of said element; to protect the operating parts of such joint from access thereto of wear-creating and rust-creating impurities; to provide such joint with novel means for centralizing the bearing blocks, which centralizing means can, furthermore, be removable, together with the driving element and the bearing blocks.

Figure 1:
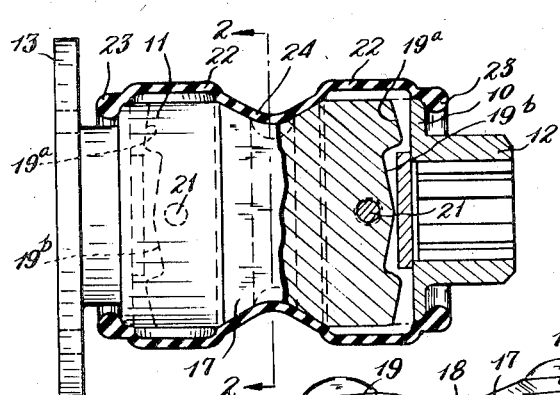
Figure 2:
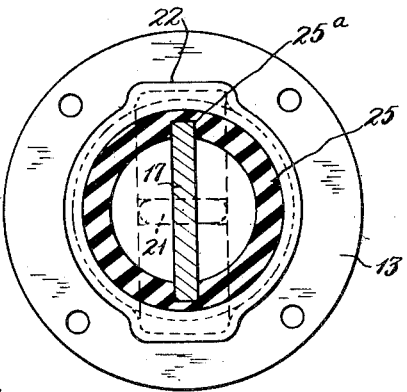
Figure 4:
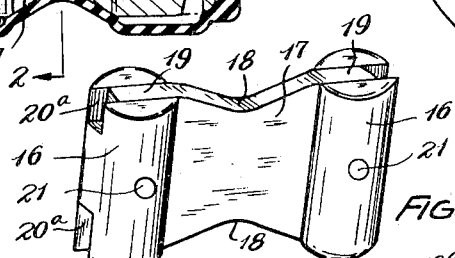
Figure 3:
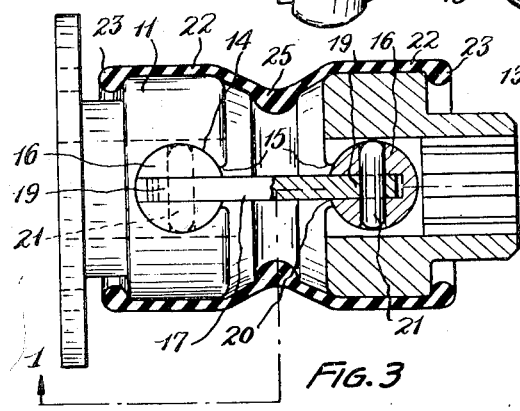
Figure 5:
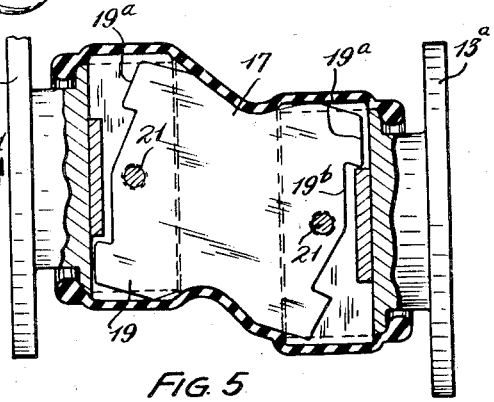

Further objects and advantages of the invention will be pointed out hereinafter in the description of the embodiments of my invention as shown in the drawing hereof, wherein Fig. 1 represents a view, partly in section and partly in side elevation, of a universal joint constructed in accordance with my invention; Fig. 2 a sectional view taken on the line 2—2 of Fig. 1 and looking in the direction of the arrows; Fig. 3 a view, similar to Fig. 1, but showing the appearance of the parts of the joint when the latter has been rotated 90° from its position in Fig. 1; Fig. 4 a detail in perspective of the driving mechanism by which the yokes are connected; Fig. 5 a sectional elevational view, similar to Fig. 1, showing the manner in which the joint made in accordance with my invention operates and wherein the shaft sections which are connected thereby are axially offset and both of the yokes are provided with flanged bases; and Fig. 6 a view, similar to Fig. 1, showing a further modification of my invention.

Describing the parts shown herein by reference characters, and referring first to Figs. 1 to 4, inclusive, 10 and 11 represent yokes, the former yoke being provided with a splined sleeve 12 for application to the mating end of a shaft section and the yoke 11 being provided with a flanged base 13 for securing the same to the other shaft section. For convenience of description, the ends or faces of the yokes which are presented toward each other will be referred to hereafter as the "inner" ends or faces and the ends which are provided with the shaft-attaching means as the "outer" ends. Each of these yokes is preferably cylindrical in shape and is provided with a cylindrical bore 14 extending diametrically therethrough, the inner end of each yoke being provided with a slot 15 merging with the said bore and extending the full length thereof. The cylindrical bores form bearings for cylindrical bearing blocks 16, said bearing blocks being somewhat longer than said bores and being connected by a driving element 17, which is shown in Figs. 1-5 as a relatively thin plate having the central portions of opposed edges depressed or recessed, as shown at 18, the end portions 19 of the said plate being inserted into slots 20 in the bearing blocks. The width of the end portions of the plate thus inserted are of the full length of the slots, and the thickness of the portions of the driving plate which enter the slots 15 are materially less than the width of these slots, thereby providing for relative movement between the yokes in planes at right angles to the said plate.

For the purpose of holding the driving plate and the bearing blocks assembled into a unitary structure, retaining pins 21 extend through the central portions of the bearing blocks and through the end portions 19 of the driving plate, being preferably loosely fitted in the bearing blocks and having a tight fit in the portions of the driving plates through which they extend. These pins serve to connect the bearing blocks and the driving plate as a unit, whereby these parts may be assembled with and disassembled from the yokes without the necessity for using any tools. The pins 21 are preferably rounded off or chamfered at their ends, whereby they constitute parts of the cylindrical operating surfaces of the bearing blocks. Furthermore, the ends of the blocks 16 are themselves preferably chamfered slightly, to facilitate their insertion into the cylindrical bearing bores provided therefor in the yokes.

In order to obtain a maximum area of surface engagement between the end portions of the driving plate and the bearing blocks, the slots which are provided in the bearing blocks for the reception of these portions are extended entirely through the end portions of the bearing blocks, as indicated at 20ª, and the ends of the plate are provided with extensions 19ª which are adapted to project into the slot extensions, and the portion of each end between said extensions is inclined from the base of each extension toward the center of such end, as shown at 19ᵇ. This construction is particularly useful where the shaft sections connected by my universal joint are axially offset, as shown in Fig. 5, in which case one of the extensions 19ª at each end of the plate will project into a slot extension 20ª. The inclination of the ends of the plates between the bases of said extensions accommodates the tilting of the plate without interference by the solid portion of each block between the slot extensions 20ª.

In order to retain the bearing blocks properly centralized within the bearings provided therefor in their respective yokes, I apply to the exterior surface of each yoke a flexible constricting tension member which engages the ends of the bearing blocks and thus insures that they shall maintain their proper centralized positions within their respective bearing bores. While a rubber band of suitable width or a coiled spring of the garter type may be employed for this purpose, I prefer to use a sleeve-like member made from a compound capable of resisting heat and oil and capable of exerting constricting tension upon the yokes and the blocks. In the embodiment shown in Figs. 1, 2, 3 and 5, sleeve-like members are formed integrally with an intermediate connecting sleeve of less diameter than the said members and forming a boot therewith. This boot will entirely enclose and give full protection to the working parts of the joint, and can also form part of the driving unit comprising the driving plate and the bearing blocks.

Referring more particularly to Figs. 1, 2, 3 and 5, the boot consists of the expanded sleeve end members 22, each adapted to fit tightly upon the yokes and to engage the ends of the bearing blocks. The outer end of each sleeve is provided with a heavy inturned bead 23 adapted to engage the outer peripheral portion of the yoke to which it is applied, the sleeve end members being connected by an integral intermediate outwardly concave portion 24 of less diameter than the diameters of the end members, this intermediate portion being provided with a reinforcing rib 25 extending inwardly therefrom and being slotted, as shown at 25ª, for the reception of the edges of the intermediate portion of the driving plate, as illustrated more particularly in Figs. 1, 2, and 3.

When the parts are assembled in the manner shown and described, they provide a power transmitting means which is capable of angular displacement; in other words, they provide a double universal joint.

The construction of the boot 22—25 is such that, in cooperation with the recessed intermediate portion of the driving plate, the end beads of the sleeve members may be distended thereby to enable the same to be removed from engagement with the outer ends of their respective yokes and the sleeve members may then be rolled toward each other, over the yokes, the entire boot will then be mounted upon the intermediate portion of the driving plate. Thereupon, the boot, together with the driving plate and the bearing blocks, may be removed from the yokes as a unit, and the same unit, or a similar unit, may be assembled with the yokes. After the bearing blocks have been positioned within the yokes, the sleeve end members of the boot may be unrolled and fitted upon the yokes in the manner shown in the drawings.

In Fig. 5 there is shown a modification of my invention which differs from the embodiments shown in the preceding views only in that each of the yokes has a base flange, the same being designated by numerals 13 and 13ª and the shaft sections being axially offset. By providing both yokes with base flanges, either a thrust or a pull may be transmitted from one shaft section to the other, as is the case where the joint shown herein is applied to a marine propeller shaft, in the operation of which a thrust will be exerted by the propeller when it is being driven ahead and a pull will be exerted when the propeller is driven in a reverse direction.

Figure 6:
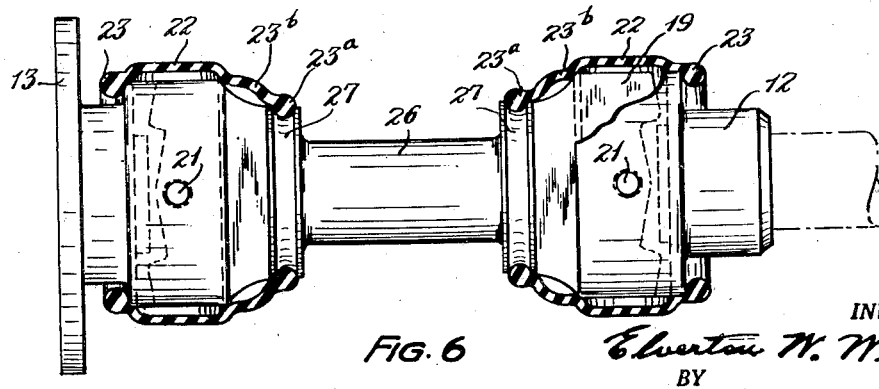

In Fig. 6, I have shown a further modification of my invention wherein the driving element is constructed in substantially the same manner as is the case with the driving element shown in the preceding views. However, instead of using a plate for the intermediate portion of the driving element, this intermediate portion is of different shape. As shown herein, it may be cylindrical, as indicated at 26, having its opposite ends provided with annular seats 27 to which seats the plate-like ends 19 are integrally connected, these ends being constructed in the same manner as the like-designated parts in the preceding views. Where the driving element is constructed in the manner shown herein, I do not unite the sleeve members which cover the yokes and the ends of the bearing blocks, but provide a separate sleeve member for each yoke and bearing block. Each of these sleeve members is of the same general shape as the major portion of the sleeve members in the preceding views, and each member comprises a body 22 covering the yoke and the ends of the blocks, a bead 23 for engaging the outer peripheral portion of the yoke and having at its inner end a bead 23ª which is adapted to fit in the concave annular seat 27 provided therefor. I preferably provide each sleeve with a fold or fullness, as shown at 23ᵇ.

It will be obvious that the assembly comprising the driving element and the sleeves may be conveniently assembled with and disassembled from the yokes in substantially the same manner as is the case with the embodiment of my invention shown in the preceding views. By rolling each sleeve member inwardly to clear the yoke to which it is applied, the sleeve members, together with the driving element and the bearing blocks, may be removed from the yokes and may afterwards be assembled with the same.

In practice, I prefer to make the bearing blocks of sintered powdered metal, vacuum-filled with lubricating oil; also to chromium-plate all metal parts for the prevention of rust and for increasing the wearing qualities.

Furthermore, the bearing blocks need not be integral, but may be made as symmetrical identical halves united by pins, or in any other convenient manner.

Having thus described by invention, what I claim is:

1. A universal joint comprising a pair of yokes each having means for attaching the same to a shaft section and each having a cylindrical bearing bore extending therethrough and each having a slot extending from the inner face thereof to and intersecting the bearing bore therein and being of substantially the full length of said bore, a cylindrical bearing block adapted to be inserted within each of the said bores, each of the bearing blocks having a slot extending longitudinally of and for substantially the full length thereof, and a driving element having ends adapted to be received within the slots of the bearing blocks and within the slots in the yokes, the portions of the driving element which project through the slots in the yokes being of less width than the width of these slots, the slot in each bearing block being projected through the end portions of the rear surface thereof and the ends of the driving element being provided with extensions adapted to enter the projected portions of the slots when the shaft sections to which the yokes are respectively connected are axially offset from each other.

2. A universal joint comprising a pair of yokes each having means for attaching the same to a shaft section and each having a cylindrical bearing bore extending therethrough and each having a slot extending from the inner face thereof and intersecting the bearing bore therein and extending longitudinally of and for substantially the full length of said bore, cylindrical bearing blocks adapted to be inserted within the said bores, each of the bearing blocks having a slot extending longitudinally of and for substantially the full length thereof, a driving element having ends adapted to be received within the slots of the bearing blocks and within the slots in the yokes, the portions of the driving element which project through the slots in the yokes being of less thickness than the width of these slots, and a rubber-like flexible constricting retaining member surrounding each yoke and having rib means extending about and engaging the opposite ends of the yokes, said rubber-like member having a depressed midsection engaging said driving element, said rubber-like member also being in intimate engagement with the periphery of said yokes throughout their length whereby said rubber-like element tends to center said bearing blocks within their respective bores.

3. A universal joint comprising a pair of yokes each having means for attaching the same to a shaft section and each having a cylindrical bearing bore extending therethrough and each having a slot extending from the inner face thereof and intersecting the bearing bore therein and extending longitudinally of and for substantially the full length of said bore, cylindrical bearing blocks adapted to be inserted within the said bores, each of the bearing blocks having a slot extending longitudinally of and for substantially the full length thereof, a driving element having ends adapted to be received within the slots of the bearing blocks and within the slots in the yokes, the portions of the driving element which project through the slots in the yokes being of less thickness than the width of these slots, and a flexible constricting retaining member surrounding each yoke and extending about and engaging the opposite ends of the bearing block therewithin and adapted to center each bearing block within its respective bore, the portion of the driving element intermediate of the portions which enter the slots in the yokes being of less width than said portions and the flexible constricting retaining members being of sleeve-like form and extending about the respective yokes, the driving element having a central portion of less width than the width of the ends whereby the flexible constricting retaining members may be withdrawn upon the intermediate portion of the driving element and the driving element, bearing blocks and flexible constricting retaining members may then be removed as a unit from the bearing bores and the yokes.

4. A universal joint comprising a pair of yokes each having means for attaching the same to a shaft section and each having a cylindrical bearing bore extending therethrough and each having a slot extending from the inner face thereof and intersecting the bearing bore therein and extending longitudinally of and for substantially the full length of said bore, cylindrical bearing blocks adapted to be inserted within the said bores, each of the bearing blocks having a slot extending longitudinally of and for substantially the full length thereof, a driving element having ends adapted to be received within the slots of the bearing blocks and within the slots in the yokes, the portions of the driving element which project through the slots in the yokes being of less thickness than the width of these slots, and a flexible constricting retaining member surrounding each yoke and extending about and engaging the opposite ends of the bearing block therewithin and adapted to center each bearing block within its respective bore, the driving element having its opposite edges recessed intermediate of its ends and the flexible constricting retaining members being of sleeve-like formation and formed on the ends of a continuous boot, each member having an inwardly projecting bead formed on the outer end thereof for engagement with the outer peripheral portion of a yoke and the boot having a central portion of less diameter than the diameter of the sleeve-like end members and adapted to contact the edges of the recessed portion of the driving element whereby the sleeve-like end members of the boot may be withdrawn upon the recessed portion of the driving element and the driving element, bearing blocks and boot may then be removed as a unit from the bearing bores in the yokes.

5. A universal joint comprising a pair of yokes each having means for attaching the same to a shaft section and each having a cylindrical bearing bore extending therethrough and each having a slot extending from the inner face thereof and intersecting the bearing bore therein and extending longitudinally of and for substantially the full length of said bore, a cylindrical bearing block adapted to be inserted within each of the said bores, each of the bearing blocks having a slot extending longitudinally of and for substantially the full length thereof, a driving element having ends adapted to be received within the slots of the bearing blocks and within the slots in the yokes, the portions of the driving element which project through the slots in the yokes being of less thickness than the width of the said slots, and the portion of said driving element intermediate of the portions which extend through the yoke slots being of plate-like formation having opposed recesses in its edges, and a boot having flexible sleeve-like end members surrounding the yokes and each provided with means for engaging the peripheral outer portion of a yoke, the portion of the boot intermediate of the end members being of less diameter than said end members and adapted to engage the edges of the intermediate portion of the driving element.

6. In the universal joint set forth in claim 5, the intermediate portion of the boot having an internal reinforcing rib formed therewith and extending therearound, the rib being provided with slots for the edges of the intermediate portion of the driving plate.

ELVERTON W. WEAVER.

REFERENCES CITED

The following references are of record in the file of this patent:

UNITED STATES PATENTS

| Number | Name | Date |
|---|---|---|
| 1,232,600 | Peck | July 10, 1917 |
| 1,659,693 | Kurtze | Feb. 21, 1928 |
| 1,711,187 | Triulzi | Apr. 30, 1929 |

FOREIGN PATENTS

| Number | Country | Date |
|---|---|---|
| 313,680 | Great Britain | 1929 |